United States Patent [19]
Ozaki et al.

[11] Patent Number: 5,397,810
[45] Date of Patent: Mar. 14, 1995

[54] POLYOL, POLYURETHANE RESIN AND UTILIZATION THEREOF

[75] Inventors: Satoshi Ozaki; Tsukuru Izukawa; Haruhiko Kawakami, all of Nagoya; Takayoshi Masuda, Tokai; Masayuki Kimura; Toshio Nozawa, both of Yokohama; Masahiko Hashiba, Fujisawa, all of Japan

[73] Assignee: Mitsui Toatsu Chemicals, Inc., Tokyo, Japan

[21] Appl. No.: 22,752

[22] Filed: Feb. 19, 1993

Related U.S. Application Data

[63] Continuation-in-part of Ser. No. 550,872, Jul. 11, 1990, abandoned.

[30] Foreign Application Priority Data

| Jul. 19, 1989 | [JP] | Japan | 1-184585 |
| Jul. 19, 1989 | [JP] | Japan | 1-184588 |
| Jul. 24, 1989 | [JP] | Japan | 1-188837 |
| Jul. 24, 1989 | [JP] | Japan | 1-188838 |
| Jan. 26, 1990 | [JP] | Japan | 2-15002 |
| Feb. 22, 1990 | [JP] | Japan | 2-39806 |

[51] Int. Cl.$^6$ .................. C08G 18/14; C07C 69/76
[52] U.S. Cl. .................. 521/137; 521/138; 521/164; 521/170; 521/171; 521/172; 521/173; 521/174; 521/180; 568/700; 568/852; 568/857; 568/867; 560/89; 560/91
[58] Field of Search ........... 521/137, 138, 164, 170, 521/171, 172, 173, 174, 180; 568/700, 852, 857, 867; 560/89, 91

[56] References Cited

U.S. PATENT DOCUMENTS

| 3,755,212 | 8/1973 | Dunlap et al. | 521/133 |
| 4,060,509 | 11/1977 | Olstowski | 524/710 |
| 4,146,498 | 3/1979 | Sandner et al. | 521/173 |
| 4,195,151 | 3/1980 | Dunleavy et al. | 521/167 |
| 4,247,655 | 1/1981 | Dunleavy et al. | 521/164 |
| 4,248,994 | 2/1981 | Cook | 528/60 |
| 4,454,255 | 6/1984 | Ramlow et al. | 521/137 |
| 4,487,853 | 12/1984 | Reichel et al. | 521/172 |
| 4,539,341 | 9/1985 | Hallmark et al. | 521/172 |
| 4,607,064 | 8/1986 | Kuhn et al. | 521/174 |
| 4,652,591 | 3/1987 | Londrigan | 521/172 |
| 4,661,529 | 4/1987 | Kuhn et al. | 521/174 |
| 4,710,521 | 12/1987 | Soukup et al. | 521/164 |
| 4,789,690 | 12/1988 | Milanovic-Lerik et al. | 521/170 |
| 4,853,419 | 8/1989 | Hallmark et al. | 521/172 |

FOREIGN PATENT DOCUMENTS

| 0124071A3 | 4/1983 | European Pat. Off. |
| 0112627A1 | 4/1984 | European Pat. Off. |
| 0112627 | 4/1984 | European Pat. Off. |
| 57-151613 | 9/1982 | Japan |
| 57-151614 | 9/1982 | Japan |
| 2207925A | 2/1989 | United Kingdom |

OTHER PUBLICATIONS

Database WPI, Derwent Publ. Ltd., London, GB & JP-B-46018506, Mitsui Toatsu Chemical; Feb. 1971.
Chemical Abstracts, Narutomi Masaki et al, "Preparation of polyurethane foams with improved fluidity and filling properties during foaming", vol. 113, No. 2, Jul. 9, 1990.

*Primary Examiner*—John Kight, III
*Assistant Examiner*—John M. Cooney, Jr.
*Attorney, Agent, or Firm*—Burns, Doane, Swecker & Mathis

[57] ABSTRACT

The present invention relates to a novel polyol obtained by using a specified polyhydric alcohol, polyoxyalkylene polyol, aliphatic amine and/or alkamlamine as a raw material and adding an organic polycarboxylic acid or its anhydride and an alkylene oxide; a polyurethane resin prepared from said novel polyol and an organic polyisocyanate; a rigid polyurethane foam prepared by using a hydrochlorofluorocarbon or hydrofluorocarbon foaming agent which has very low public hazards; and a composite utilizing thereof.

The production of rigid polyurethane foam by using the polyol of the invention can be carried out in good operation efficiency and low public hazards. Additionally, properties of the foam thus obtained is equivalent to those of rigid polyurethane foams obtained by using conventional chlorofluorocarbons. Consequently, the rigid polyurethane foam of the invention is very useful for insulation materials and structural insulation materials.

31 Claims, No Drawings

POLYOL, POLYURETHANE RESIN AND UTILIZATION THEREOF

This application is a continuation of application Ser. No. 07/550,872, filed Jul. 11, 1990, now abandoned.

BACKGROUND OF THE INVENTION a) Field of the Invention

The present invention relates to a polyol, polyurethane resin, rigid polyurethane foam, preparation process thereof and a composite of said rigid polyurethane foam.

More particularly, the polyol of the present invention is a raw material for preparing a polyurethane resin having resistance to dissolving in hydrochlorofluorocarbons (hereinafter abbreviated as HCFC) and hydrofluorocarbons (hereinafter abbreviated as HFC) which as foaming agents cause very low public hazards. The polyol can provide a rigid polyurethane foam and a composite thereof, when used with the above foaming agents.

The rigid polyurethane foam has excellent properties which are equivalent to those of conventional polyurethane foams obtained by the use of chlorofluorocarbons (hereinafter abbreviated as CFC) as foaming agents. Hence, the rigid polyurethane foam of the present invention is extremely useful as an insulating material or insulating structural material for electric refrigerators, freezing ware houses, insulation panels, ships and vehicles.

b) Description of the Prior Art

In the conventional process of producing polyurethane foams, chlorofluorocarbons, particularly CFC-11 (trichlorofluoromethane) and CFC-12 (dichlorodifluoromethane) which are CFCs, have been used as a means of foaming. These materials have been recognized as hazardous and environmentally destructive materials as they decompose the ozone layer of the earth or enhance the green house effect. The production and use of these materials has recently been restricted. At the same time, attention has been directed to HCFC-123 (2,2-dichloro-1,1,1-trifluoroethane) and HCFC-141b (1,1-dichloro-1-fluoroethane), and additionally HFC-134a (1,1,1,2-tetrafluoroethane), HFC-152a (1,1-difluoroethane), as substitutes for CFC-11 and CFC-12. These substitutes, however, have a larger dissolving power with respect to polyurethane resins compared to CFC-11 and CFC-12, and thus are likely to significantly deteriorate polyurethane foam properties. For example, their use can decrease closed cell content and foam strengths. Heat insulation effects which are characteristic of rigid polyurethane foam can be significantly lowered because the above fluorocarbons dissolve walls of closed cells in the foam during the foaming reaction.

Consequently, a novel polyurethane resin has been desired. Conventional polyoxyalkylene polyols used as the raw material of polyurethane resins show a decrease in viscosity with an increase in the amount of added alkylene oxide. As a result, operations in polyurethane foam production can be conducted with ease. However, an excess addition of alkylene oxide leads to a dissolution of polyurethane resin in HCFC-123, HCFC-141b and HFC, and tends to make application of these foaming agents substantially impossible. On the other hand, when the amount of added alkylene oxide is reduced, the polyol becomes solid or extremely viscous and is very difficult to handle.

Japanese TOKKAI SHO 57-151613 (1982) and Japanese TOKKAI SHO 57-151614 (1982) disclose methods for blending low molecular weight polyols in order to decrease the viscosity of a mixture of an amine base polyol and an aromatic base polyester polyol (alkylene oxide was not added in the latter).

As mentioned above, in order to maintain resistance to dissolution in HCFC-123, HCFC-141b and HCF, operation efficiency in polyurethane foam production must be sacrificed significantly. A polyoxyalkylene polyol which has a viscosity suitable for the foaming operation and provides excellent mixing and dispersing capabilities in HCFC-123, HCFC-141b and HFC, has never been found.

SUMMARY OF THE INVENTION

The present invention relates to a novel polyol obtained by using a specified polyhydric alcohol, polyoxyalkylene polyol, aliphatic amine and/or alkanolamine as a raw material and adding an organic polycarboxylic acid or its anhydride and an alkylene oxide; a polyurethane resin prepared from said novel polyol and an organic polyisocyanate; a rigid polyurethane foam prepared by using a hydrochlorofluorocarbon or hydrofluorocarbon foaming agent having a low public hazard; and a composite thereof.

The production of a rigid polyurethane foam by using the polyol of the invention can be carried out with good operation efficiency and low public hazard. Additionally, properties of the foam thus obtained are equivalent to those of rigid polyurethane foams obtained by using conventional chlorofluorocarbons. Consequently, the rigid polyurethane foam of the invention is very useful as insulation materials and structural insulation materials.

DETAILED DESCRIPTION OF THE INVENTION

The primary object of the present invention is, particularly in the context of the production of a rigid polyurethane foam, to provide a polyol which gives equivalent operation efficiency in polyurethane foaming operations and resultant foam properties to those using conventional chlorofluorocarbons, even though hydrochlorofluorocarbons and/or hydrofluorocarbons having very low hazards are used.

As a result of an intensive investigation in order to achieve the above object, the present inventors have completed the present invention.

That is, the aspect of the present invention is illustrated by the following characteristics (1) to (5).

(1) A polyol prepared by a process comprising using a compound having at least one ester bond and/or amido bond in a molecule or a mixture thereof as a starting material, and further adding an alkylene oxide, said compound being obtained by reacting an organic polycarboxylic acid or an anhydride thereof with a single compound or mixture of compounds selected from the group consisting of:

(a) a polyhydric alcohol having from 3 to 8 hydroxyl groups in a molecule, (b) a polyoxyalkylene polyol having from 3 to 8 hydroxyl groups in a molecule, (c) an aliphatic amine having from 2 to 6 primary and/or secondary amino groups in a molecule and represented by the formula (I):

$$H_2N-R+NH-R\overline{)_n}NH_2 \qquad (I)$$

wherein R is an alkylene group of from 1 to 6 carbon atoms in a molecule and n is 0 or an integer of from 1 to 4, and (d) an alkanolamine represented by the formula (II) or the formula (III):

$$H_2N-R_1OH \qquad (II)$$

$$HN=(R_1OH)_2 \qquad (III)$$

wherein $R_1$ is an alkylene group having from 1 to 6 carbon atoms.

(2) A polyurethane resin prepared by mixing and reacting a polyol with an organic polyisocyanate comprising using the polyol described in (1) as a portion of or all of said polyol.

(3) A rigid polyurethane foam obtained by mixing and reacting an organic polyisocyanate with a resin premix containing a polyol, foaming agent, catalyst, cell regulator and other additives, wherein the polyol is the polyol described in (1) and is used as a portion of or all of said polyol, and said foaming agent is a single member or a mixture of the members selected from a group consisting of hydrochlorofluorocarbons, hydrofluorocarbons, or such a foaming agent in combination with one or more other foaming agents; and if necessary, the premix contains an auxiliary foaming agent which is water and/or a low boiling point compound.

(4) A process for the preparation of a rigid polyurethane foam by mixing and reacting an organic polyisocyanate with a resin premix containing a polyol, foaming agent, catalyst, cell regulator, and other additives, wherein the polyol is the polyol described in (1) and is used as a portion of or all of said polyol, and said foaming agent is a single member or a mixture of members selected from a group consisting of hydrochlorofluorocarbons, hydrofluorocarbon, or such a foaming agent in combination with one or more other foaming agents; and, if necessary, the premix contains an auxiliary foaming agent which is water and/or a low boiling point compound.

(5) A process for the preparation of a rigid polyurethane foam composite by mixing an organic polyisocyanate with a resin premix containing a polyol, forming agent, catalyst, cell regulator and other additives and forming said rigid polyurethane foam on a facing material or in a cavity surrounded by a plurality of facing materials to constitute said composite which comprises using the polyol described in (1) as a portion of or all of said polyol, and said foaming agent is a single member or mixture of members selected from a group consisting of a hydrochlorofluorocarbons, hydrofluorocarbons, or, such a foaming agent in combination with one or more other foaming agents; and if necessary, the premix contains an auxiliary foaming agent which is water and/or a low boiling point compound.

The polyhydric alcohol (a) or the polyoxyalkylene polyol (b) for use in the invention has from 3 to 8 hydroxyl groups in a molecule, and the hydroxyl group reacts with an organic polycarboxylic acid or its anhydride to form a compound having at least one ester bond. Alkylene oxide further adds and reacts with the compound to form a polyol having at least one ester skeleton.

Exemplary polyhydric alcohols (a) used in the process of the invention include glycerin, trimethylolpropane, 1,2,6-hexanetriol, triethanolamine, pentaerythritol, tetramethylolcyclohexane, methylglucoside, 2,2,6,6-tetrakis(hydroxyl)cyclohexanol, sorbitol, mannitol and dulcitol. Polyoxyalkylene polyol (b) can be obtained by the addition of alkylene oxide to the above polyhydric alcohol. These compounds can be used singly or in combination.

Representative examples of the organic polycarboxylic acids and the anhydrides thereof include succinic acid, phthalic acid, trimellitic acid, pyromellitic acid, methyltetrahydrophthalic acid, maleic acid, and anhydrides of these polycarboxylic acids. These compounds may be used singly or as a mixture.

The alkylene oxide used in the invention includes, for example, ethylene oxide, propylene oxide and butylene oxide. These oxides may be used singly or as a mixture, simultaneously or successively.

The polyol for use in the invention is, as mentioned above, prepared by the addition reaction of 0.125 to 1.0 mole of the organic polycarboxylic acid or its anhydride and subsequently 1.0 to 3.0 moles of alkylene oxide to one of hydroxyl group in the polyhydric alcohol (a) and/or the polyoxyalkylene polyol (b) having from 3 to 8 hydroxyl groups in a molecule.

When the number of hydroxyl groups in a molecule is less than 3, the resulting polyurethane foam tends to have lower foam strengths. On the other hand, a number of hydroxyl groups exceeding 8 in a molecule causes too many ester bonds, and too high a viscosity of the polyol, and thus poor operation efficiency in the foaming operation.

When the amount of the organic polycarboxylic acid or its anhydride added is less than 0.125 mole per one of the hydroxyl group in the polyhydric alcohol (a) and/or polyoxyalkylene polyol(b), solubility for flons of the rigid polyurethane foam obtained by reacting with polyisocyanate increases and physical properties tend to deteriorate, although the mixing and dispersing ability to HCFC and HFC is equivalent to conventional polyols. On the other hand, an organic polycarboxylic acid or its anhydride exceeding 1.0 mole causes high viscosity of polyol, poor mixing and dispersing ability in HCFC and HFC, and results in a disadvantage of rendering the polyurethane foam brittle.

When the amount of alkylene oxide is less than 1.0 mole per one of the hydroxyl group and/or carboxyl group in the starting material, that is, the polyol contains many free hydroxyl group and/or carboxyl groups in the molecule, the resulting polyurethane foam has unfavorably poor physical properties. On the other hand, when the amount of added alkylene oxide is in excess of 3.0 moles per one mole of the hydroxyl group, solubility for flons of the resulting polyurethane foam increases and physical properties tend to deteriorate, although the polyol has a low viscosity and good mixing and dispersing ability in HCFC and HFC.

The catalyst used for the addition reaction of the organic polycarboxylic acid or its anhydride and alkylene oxide to the hydroxyl group of the polyhydric alcohol (a) and/or polyoxyalkylene polyol (b) in the present invention is an amine compound represented by the formula (IV) or formula (V):

$$NR_2R_2R_3 \qquad (IV)$$

$$R_2R_3N(CH_2)_mNR_2R_3 \qquad (V)$$

wherein $R_2$ and $R_3$ are a hydrogen atom or a group selected from a group consisting of alkyl group having from 1 to 6 carbon atoms, —$CH_2CH_2OH$ and —$CH_2CH(CH_3)OH$, but $R_2$ and $R_3$ cannot be hydrogen atoms at the same time in the formula (IV), and m is an integer of from 1 to 6.

Exemplary amine compounds include dibutylamine, ethylenediamine, tetramethylenediamine, monoethanolamine, diethanolamine, triethanolamine, isopropanolamine, triethylamine, tri-n-propylamine, di-n-propylamine, n-propylamine, n-amylamine, N,N-dimethylethanolamine, isobutylamine, isoamylamine and methyldiethylamine.

Metal hydroxide can also be used as the catalyst for the above addition reaction. Representative examples of alkali hydroxides include lithium hydroxide, sodium hydroxide, potassium hydroxide, magnesium hydroxide, calcium hydroxide and barium hydroxide.

The above amine and metal hydroxide catalysts can be used singly or in combination.

The amount of the above catalysts used for the invention should be from 0.1 to 2.0 parts by weight per 100 parts by weight of the polyhydric alcohol (a) and/or the polyoxyalkylene polyol (b).

The polyol of the present invention can be prepared by charging in an autoclave the polyhydric alcohol(a) and/or poly oxyalkylene polyol(b), organic polycarboxylic acid or its anhydride, and the catalyst, carrying out the reaction of these raw materials and then gradually feeding alkylene oxide to conduct the addition reaction. Preferred reaction temperature is 90° to 130° C. If the temperature is lower than 90° C. it is difficult to progress the reaction. On the other hand, a temperature exceeding 130° C. is liable to cause side reactions.

The aliphatic amine (c) for use in the invention has primary and/or secondary amino groups. The sum of both amino groups is from 2 to 6 in a molecule. These amino groups react with the organic carboxylic acid or its anhydride. Alkylene oxide is further reacted with the resulting intermediate to form polyol having amido and ester skeletons (these skeletons are formed by reaction of carboxyl group and alkylene oxide).

The aliphatic amine (c) used in the invention as another raw material is represented by the formula (I):

wherein R is an alkylene group having from 1 to 6 carbon atoms and n is 0 or an integer of 1 to 4.

Exemplary above aliphatic amine (c) suitable for use includes ethylenediamine, diethylenetriamine, triethylenetetramine, tetraethylenepentamine, and pentaethylenehexamine. These aliphatic amines can be used singly or as a mixture.

As mentioned above, the other polyol for use in the invention is prepared by the addition of 0.166 to 1.0 mole of the organic polycarboxylic acid or its anhydride and subsequently 1.0 to 3.0 moles of alkylene oxide to one of aliphatic amine (c) which contains from 2 to 6 primary and/or secondary amino groups in the molecule.

When the number of these primary and/or secondary amino groups is less than 2 in a molecule, the resulting polyurethane foam tends to have lower foam strengths. On the other hand, amino groups in excess of 6 in a molecule increases amido and ester bonds, and hence the viscosity of resulting polyol goes up and gives an adverse effect in the operation efficiency of the foaming operation.

When the amount of the organic polycarboxylic acid or its anhydride reacted is less than 0.166 mole per one of the primary and/or secondary amino groups, properties of the resulting polyurethane foam are liable to deteriorate, although the mixing and dispersing ability in HCFC-123, HCFC-141b and HFC is equivalent to conventional polyoxyalkylene polyol. On the other hand, an amount of the organic polycarboxylic acid or its anhydride exceeding 1.0 mole causes a disadvantage in that the viscosity of polyol increases, the mixing and dispersing ability in HCFC decreases and the resulting polyurethane foam becomes brittle.

When the amount of alkylene oxide reacted is less than 1.0 mole per one mole of the primary and/or secondary amino groups, unreacted amino groups and carboxyl groups remain after the reaction and reactivity with organic polyisocyanate tends to deteriorate. On the other hand, an amount exceeding 3.0 moles reduces viscosity of polyoxyalkylene polyol and time physical properties of resulting polyurethane foam tends to deteriorate, although the mixing and dispersing ability in HCFC-123, HCFC-141b and HFC improves.

The catalyst used for the addition reaction of the organic polycarboxylic acid or its anhydride and alkylene oxide to aliphatic amine (c) in the present invention is the same as used in the reaction of the polyhydric alcohol (a) and/or polyoxyalkylene polyol (b) described above.

The temperature and other reaction conditions employed for the preparation of polyol are also the same as above.

An alkanolamine (d) having a hydroxyl group in addition to the primary and/or secondary amino groups and represented by the formula (II) and the formula (III):

wherein $R_1$ is an alkylene group having from 1 to 6 carbon atoms, can also be used in the process of the invention.

Exemplary alkanolamines (d) suitable for use in the invention includes monoethanolamine, diethanolamine, monoisopropanolamine, monobutanolamine and dihexanolamine.

The alkanolamine (d) can be reacted alone with the organic polycarboxylic acid or its anhydride, or this alkanolamine (d) can be mixed with a single compound or more than two compounds selected from a group of polyhydric alcohol (a), polyoxyalkylene polyol (b) and alphatic amine (c), and is reacted with the organic polycarboxylic acid or its anhydride to give a starting material. The above starting material is added and reacted with alkylene oxide to give a polyol.

The polyol of the present invention can be used singly or as a mixture with other polyols.

The amount of other polyols to be mixed is preferably from 0 to 70 parts by weight per 100 parts by weight of the total polyol.

Exemplary other polyols which are suitable for use are polyether polyols having a hydroxyl value of 200 to 800 mg KOH/g which are obtained by the addition polymerization of alkylene oxide to polyhydric alcohols and/or polyhydroxy compounds such as ethylene glycol, propylene glycol, diethylene glycol, triethylene glycol, dipropylene glycol, glycerin, trimethylol propane, 1,3,6-hexanetriol, pentaerythritol, sorbitol, sucrose, bisphenol A, novolak, hydroxylated 1,2-polybutadiene, and hydroxylated 1,4-polybutadiene; alkanol amines such as diethanolamine and triethanolamine; amines such as ethylenediamine, diethylenetriamine, ammonia, aniline, tolylenediamine, xylenediamine, diaminodiphenylmethane and other compounds containing at least two active hydrogen atoms. Suitable alkylene oxide for use in the preparation of these polyoxyalkylene polyols are ethylene oxide, propylene oxide, butyrene oxide and styrene oxide. Polytetramethylene ether glycol, polyester polyol prepared from polyhydric alcohol and organic polycarboxylic acid or its anhydride, and polycaprolactone copolyesterpolyol can also be used.

No particular restriction is imposed upon the organic polyisocyanate for use in the process of the invention.

Conventionally known organic polyisocyanates, for example, aromatic, aliphatic and alicyclic polyisocyanates and their modified products can be used. Exemplary polyisocyanates which are suitable for use include phenyldiisocyanate, diphenylmethane diisocyanate, crude diphenylmethane diisocyanate, tolylene diisocyanate, crude tolylene diisocyanate, xylylene diisocyanate, hexamethylene diisocyanate, isophorone diisocyanate, hydrogenated diphenylmethane diisocyanate, hydrogenated tolylene diisocyanate, triphenylmethane triisocyanate, tolylene triisocyanate, polymethylenepolyphenylpolyisocyanate, modified polyisocyanates such as carbodiimide modified diphenylmethane diisocyanate, and isocyanate terminated prepolymers which can be obtained by reacting the above polyisocyanate with the polyoxyalkylene polyol or polymer polyol in a NCO/active H equivalent ratio of from 2 to 20 and have an isocyanate content of from 5 to 35% by weight.

These polyisocyanates can be used singly or in combination.

The equivalent ratio of the polyisocyanate to the hydroxyl group in the resin premix is in the range of from 0.8 to 5.0. An equivalent ratio exceeding 5.0 leads to remaining unreacted polyisocyanate. On the other hand, an equivalent ratio less than 0.8 results in remaining unreacted polyoxyalkylene polyol. Hence the above range is preferable.

The foaming agent for use in the invention is hydrochlorofluorocarbons and hydrofluorocarbons.

Exemplary hydrochlorofluorocarbons include 2,2-dichloro-1,1,1-trifluoroethane (HCFC-123), 1,1-dichloro-1-fluoroethane (HCFC-141b) and monochlorodifluoromethane. Representative hydrofluorocarbons include 1,1,1,2-tetrafluoroethane and 1,1-difluoroethane. These foaming agents can be used singly or in combination. When necessary, water and/or low boiling point compound and other auxiliary foaming agents can be used in combination.

Water is usually used in an amount of from 0.5 to 5.0 parts by weight per 100 parts by weight of the resin premix. Exemplary low boiling point compounds include methylene chloride and other low boiling point hydrocarbons (boiling point is from 10° to 50° C.) and their mixtures. Conventional chlorofluorocarbons can also be used in combination.

The catalyst which can be used for the rigid polyurethane foam preparation of the invention includes, for example, amine catalysts such as triethylamine, tripropylamine, triisopropanolamine, tributylamine, trioctylamine, hexadecyldimethylamine, N-methylmorpholine, N-ethylmorpholine, N-octadecylmorpholine, monoethanolamine, diethanolamine, triethanolamine, N-methyldiethanolamine, N,N-dimethylethanolamine, diethylenetriamine, N,N,N',N'-tetramethylethylenediamine, N,N,N',N'-tetramethylpropylenediamine, N,N,N',N'-tetramethylbutanediamine, N,N,N',N'-tetramethyl-1,3-butanediamine, N,N,N',N'-tetramethylhexamethylenediamine, bis [2-(N,N-dimethylamino)ethyl] ether, N,N-dimethylbenzylamine, N,N-dimethylcyclohexylamine, N,N,N',N',N''-pentamethyldiethylenetriamine, triethylenediamine, formic acid and other acid salts of triethylenediamine oxyalkylene adducts of primary and secondary amines, aza ring compounds such as N,N-dialkylpiperazine, and various N,N',N''-trialkylaminoalkylhexahydrotriazines such as β-aminocarbonyl catalyst disclosed in Japanese TOKKO SHO 52-043517 (1977) and β-aminonitrile catalysts disclosed in Japanese TOKKO SHO 53-014279 (1978); and organometallic catalysts such as tin acetate, stannous octoate, stannous oleate, stannous laurate, dibutyltin diacetate, dibutyltin dilaurate, dibutyltin dichloride, lead octoate, lead naphthenate, nickel naphthenate and cobalt naphthenate.

These catalysts can be used singly or in combination. The amount of the catalyst for use is in the range of from 0.0001 to 10.0 parts by weight per 100 parts of the polyol.

The foam regulator for use in the present invention can be a conventionally known organic silicone surfactant. Exemplary foam regulators include products of Nippon Unicar Co., Ltd. which are L-520, L-540, L-5340, L-5410, L-5420, L-5710, and -5720, products of Toray Silicone Co., Ltd. which are SH-190, SH-192, SH-193, SH-194, and SH-195, products of Shinetsu Silicone Co., Ltd. which are F-305, F-306, F-317, F-341 and F-345, and a product of Toshiba Silicone Co., Ltd. which is TFA-4200.

The amount of the cell regulator used should be in the range of from 0.1 to 20 parts by weight per 100 parts by weight of the sum of the polyol and the organic polyisocyanate.

Flame retarding agents which can be used are tris(2-chloroethyl) phosphate, tris(dichlopropyl) phosphate, tris(dibromopropyl) phosphate, products of Daihachi Chemical Co., Ltd. which are CR-505 and CR-507, and a product of Akzo Japan Co., Ltd. which is Fyrol-6.

Other additives usually employed in polyurethanes, for example, plasticizers, fillers, antioxidants, stabilizers, ultraviolet absorbers and colorants can also be added, if necessary.

In order to practice the present invention, the polyol, catalyst, cell regulator, flame retarding agent, foaming agents such as 1,1-dichloro-1-fluoroethane(HCFC-141b), 1,1-dichloro-2,2,2-trifluoroethane (HCFC-123), 1,1,1,2-tetrafluoroethane, 1,1-difluoroethane, monochlorodifluoromethane and other additives are mixed in a prescribed amount to foam a premix.

Using a polyurethane dispensing machine, the resin premix is rapidly and continuously mixed with the organic polyisocyanate at a constant ratio so as to obtain a NCO/active H equivalent ratio of from 0.8 to 5.0.

The mixture obtained is successively poured into a cavity or a mold. After pouring, liquid raw material of the rigid polyurethane foam is foamed and cured in a several minutes.

The rigid polyurethane foam obtained by the present invention can be used for the heat-insulation material or structural material of refrigerators, heat-insulating panels, ships and vehicles.

EXAMPLE

The present invention will hereinafter be illustrated further in detail by way of examples and comparative examples.

Example 1

To a 2 l autoclave, 120 g of ethylenediamine and 200 g of succinic anhydride were charged. The internal atmosphere of the autoclave was replaced with nitrogen. The mixture was heated to 120° C., 1.7 g of triethylamine was added and mixed, and then 232 g of propylene oxide was gradually charged. After reacting for 3 hours, unreacted propylene oxide was removed from the reaction system. Polyol (polyol No. 1 in Table 2) thus obtained was 521 g and had a hydroxyl value of 586 mgKOH/g, viscosity of 35000 cp/25° C. and an acid value of 0.1 mgKOH/g. Results are illustrated in Table 2.

(Polyurethane resin preparation)

12.00 g of the polyol thus obtained, organic polyisocyanate (MDI-CR, NCO% is 31.0, a product of Mitsui Toatsu Chemicals Inc.) and 0.12 g of Kaolizer No. 1 (amine catalyst, a product of Kao Co., Ltd.) were reacted at the room temperature by the formulation illustrated in Table 3, Table 7 and Table 8 and flon absorption of the polyurethane resin thus obtained were measured. Results are illustrated in the same tables.

(Rigid polyurethane foam preparation)

To 100 g of the polyol thus obtained, 1.0 g of water, 1.5 g of silicone surfactant L-5420 (a product of Nippon Unicar Co., Ltd.), 3.0 g of Kaolizer No. 1 (a product of Kao Co., Ltd.) and each amount of flon illustrated in Table 4 and Table 9 were added and mixed to obtain a premix. The premix thus obtained was mixed and reacted with each amount of polyisocyanate (MDI-CR, crude diphenylmethane diisocyanate, a product of Mitsui Toatsu Chemicals, Inc.) illustrated in the same tables at the room temperature and poured into a mold to prepare a rigid polyurethane foam.

In the step of preparing the resin premix, mixing and dispersing ability (operation efficiency) between flon and polyol was observed and closed cell content of rigid polyurethane foam were measured. Results are illustrated in the same tables.

Compositions and properties of polyols used in Comparative Examples are illustrated in Table 1.

TABLE 1

| Polyol No. | (1') | (2') |
|---|---|---|
| Polyhydric alcohol | glycerin | glycerin sucrose |
| Alkylene oxide | propylene oxide | propylene oxide |
| Hydroxyl value (mgKOH/g) | 450 | 450 |
| Viscosity (cp/25° C.) | 480 | 8500 |

Examples 2–78 and Comparative Examples 1–24

Polyols were prepared by carrying out the same procedures as described in Example 1.

When a metal hydroxide was used as catalyst, reacted material was neutralized by acid.

And, autoclaves of 2 to 4 l were applied according to the volume of raw material.

Examples 2~33, Comparative Examples 1~12(Table 2~4) are related to the polyol obtained from aliphatic amines (c), Examples 34~78, Comparative Example 13~24 (Table 5~10) are related to the polyol obtained from polyhydric alcohols (a) or polyoxyalkylenepolyol (b).

As illustrated in Table 1 to Table 10, the polyols obtained by the process of the present invention can maintain, even in the foaming system using hydrochlorofluorocarbons (for example, HCFC-123, HCFC-141b) or hydrofluorocarbons (for example HFC-134b) as a foaming agent, operation efficiency in premix preparation and rigid polyurethane foam properties equivalent to those of conventional polyurethane foaming system using chlorofluorocarbons.

TABLE 2

| | Example | | | | | | | | | | | Comp. Example | | | |
|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 |
| Polyol No. | (1) | (2) | (3) | (4) | (5) | (6) | (7) | (8) | (9) | (10) | (11) | (3') | (4') | (5') | (6') |
| Aliphatic amine (g) | | | | | | | | | | | | | | | |
| Ethylenediamine | 120 | | | | | | | | | | | | | | |
| Diethylenetriamine | | 206 | 206 | 206 | | | | | 103 | 206 | 206 | 206 | 206 | 206 | 206 |
| Triethylenetetramine | | | | | 292 | 292 | | | | | | | | | |
| Pentaethylenehexamine | | | | | | | 464 | 464 | | | | | | | |
| PCAA (g) | | | | | | | | | | | | | | | |
| Succinic anhydride | 200 | 200 | 200 | 200 | 200 | 200 | 200 | 200 | 300 | 200 | | 200 | 600 | 60 | 200 |
| Phthalic anhydride | | | | | | | | | | | 296 | | | | |
| Catalyst (g) | | | | | | | | | | | | | | | |
| Triethylamine | 1.7 | 2.3 | 3.3 | 2.2 | 2.8 | 2.8 | | | 3.0 | 1.4 | 2.8 | 3.6 | 1.6 | 3.6 | 1.8 | 2.7 |
| Dimethylethanolamine | | | | | | | 4.1 | | | | | | | | |
| KOH | | | | 2.2 | | 2.8 | | | 3.0 | 1.4 | | | | | 2.7 |
| Alkylene Oxide (g) | | | | | | | | | | | | | | | |
| Propylene oxide | 232 | 348 | 696 | 1044 | 464 | 1392 | 696 | 1392 | 522 | | 696 | 116 | 116 | 348 | 1392 |
| Ethylene oxide | | | | | | | | | | 528 | | | | | |
| Yield (g) | 521 | 710 | 1047 | 1380 | 883 | 1780 | 1293 | 1874 | 898 | 870 | 1070 | 512 | 897 | 547 | 1620 |

Note:
Comp. Example: Comparative Example
PCAA: Polycarboxylic acid anhydride

TABLE 3

(Polyurethane Resin)

| Polyol No. | Example 12 (1) | 13 (2) | 14 (3) | 15 (4) | 16 (5) | 17 (6) | 18 (7) | 19 (8) | 20 (9) | 21 (10) | 22 (11) | Comp. Example 5 (3') | 6 (4') | 7 (5') | 8 (6') |
|---|---|---|---|---|---|---|---|---|---|---|---|---|---|---|---|
| OH-Value (mgKOH/g) | 586 | 555 | 382 | 291 | 587 | 284 | 545 | 373 | 170 | 451 | 351 | 681 | 297 | 709 | 215 |
| Viscosity (cp/25° C.) | 35000 | 33000 | 28000 | 15000 | 38000 | 850 | 39000 | 11000 | 5600 | 9800 | 34000 | 7300 | 189000 | 13100 | 5300 |
| Acid value (mgKOH/g) | 0.1 | 0.2 | 0.0 | 0.0 | 0.2 | 0.0 | 0.1 | 0.0 | 0.0 | 0.2 | 0.2 | 101 | 57 | 0.0 | 0.0 |
| Resin formulation (g) | | | | | | | | | | | | | | | |
| Polyol | 12.00 | 12.00 | 12.00 | 12.00 | 12.00 | 12.00 | 12.00 | 12.00 | 12.00 | 12.00 | 12.00 | 12.00 | 12.00 | 12.00 | 12.00 |
| MDI-CR | 17.07 | 16.17 | 11.13 | 8.48 | 17.09 | 8.27 | 15.87 | 10.86 | 4.95 | 13.14 | 10.22 | 22.78 | 10.31 | 20.05 | 6.26 |
| Kaolizer No. 1 | 0.12 | 0.12 | 0.12 | 0.12 | 0.12 | 0.12 | 0.12 | 0.12 | 0.12 | 0.12 | 0.12 | 0.12 | 0.12 | 0.12 | 0.12 |
| Flon absorption | | | | | | | | | | | | | | | |
| CFC-11 | | | | | | | | | | | | | | | |
| 0 hour | 29.19 | 28.29 | 23.25 | 20.60 | 29.21 | 20.39 | 27.99 | 22.98 | 17.07 | 25.26 | 22.34 | 34.90 | 22.43 | 32.17 | 18.38 |
| 24 hours | 29.19 | 28.29 | 23.25 | 20.60 | 29.21 | 20.39 | 27.99 | 22.98 | 17.07 | 25.26 | 22.34 | * | * | 32.19 | 18.40 |
| Absorption (%) | 0.0 | 0.0 | 0.0 | 0.0 | 0.0 | 0.0 | 0.0 | 0.0 | 0.0 | 0.0 | 0.0 | * | * | 0.06 | 0.1 |
| HCFC-123 | | | | | | | | | | | | | | | |
| 0 hour | 29.19 | 28.29 | 23.25 | 20.60 | 29.21 | 20.39 | 27.99 | 22.98 | 17.07 | 25.26 | 22.34 | 34.90 | 22.43 | 32.17 | 18.38 |
| 24 hours | 29.20 | 28.29 | 23.27 | 20.60 | 29.21 | 20.40 | 27.99 | 22.98 | 17.09 | 25.26 | 22.35 | * | * | 32.85 | 18.63 |
| Absorption (%) | 0.03 | 0.0 | 0.1 | 0.0 | 0.0 | 0.05 | 0.0 | 0.0 | 0.1 | 0.0 | 0.04 | * | * | 2.1 | 1.4 |
| HCFC-141b | | | | | | | | | | | | | | | |
| 0 hour | 29.19 | 28.29 | 23.25 | 20.60 | 29.21 | 20.39 | 27.99 | 22.98 | 17.07 | 25.26 | 22.34 | 34.90 | 22.43 | 32.17 | 18.38 |
| 24 hours | 29.20 | 28.29 | 23.26 | 20.60 | 29.22 | 20.40 | 28.01 | 22.98 | 17.08 | 25.27 | 22.36 | * | * | 32.50 | 18.62 |
| Absorption (%) | 0.03 | 0.0 | 0.04 | 0.0 | 0.03 | 0.05 | 0.07 | 0.0 | 0.06 | 0.04 | 0.09 | * | * | 1.0 | 1.3 |

Note:
*Resin obtained was brittle, data could not be obtained.
OH-value: JIS K1557
Viscosity: JIS K1557
Acid value: JIS K1557
Kaolizer No. 1: Amine base catalyst (product of Kao comp.)
Flon absorption: Resin of 10 g was dipped in Flon of 100 g and weight increase of the resin after 24 hours was measured.
MDI-CR: Crude diphenylmethane diisocyanate (Product of Mitsui Toatsu Chemicals, Inc.)

TABLE 4

(Polyurethane Foam)

| Polyol No. | Example 23 (1) | 24 (2) | 25 (3) | 26 (4) | 27 (5) | 28 (6) | 29 (7) | 30 (8) | 31 (9) | 32 (10) | 33 (11) | Comp. Example 9 (3') | 10 (4') | 11 (5') | 12 (6') |
|---|---|---|---|---|---|---|---|---|---|---|---|---|---|---|---|
| OH-Value (mgKOH/g) | 586 | 555 | 382 | 291 | 587 | 284 | 545 | 373 | 170 | 451 | 351 | 681 | 297 | 709 | 215 |
| Viscosity (cp/25° C.) | 35000 | 33000 | 28000 | 15000 | 38000 | 850 | 39000 | 11000 | 5600 | 9800 | 34000 | 7300 | 189000 | 13100 | 5300 |
| Acid value (mgKOH/g) | 0.1 | 0.2 | 0.0 | 0.0 | 0.2 | 0.0 | 0.1 | 0.0 | 0.0 | 0.2 | 0.2 | 101 | 57 | 0.0 | 0.0 |
| Foam formuration (g) | | | | | | | | | | | | | | | |
| Polyol | | | | | | | | 100.0 | | | | | | | |
| H₂O | | | | | | | | 1.0 | | | | | | | |
| L-5420 | | | | | | | | 1.5 | | | | | | | |
| Kaolizer No. 1 | | | | | | | | 3.0 | | | | | | | |
| Flon | 33 | 31 | 26 | 23 | 33 | 23 | 31 | 26 | 19 | 28 | 25 | 36 | 23 | 36 | 21 |
| MDI-CR | 171 | 162 | 117 | 93 | 171 | 91 | 160 | 115 | 61 | 135 | 109 | 196 | 95 | 203 | 73 |
| Operation efficiency | | | | | | | | | | | | | | | |
| CFC-11 | | | | | | | | All good | | | | | | | |
| HCFC-123 | | | | | | | | | | | | | | | |
| HCFC-141b | | | | | | | | | | | | | | | |
| Closed cell content (%) | | | | | | | | | | | | | | | |
| CFC-11 | 88.5 | 88.8 | 88.2 | 88.6 | 88.6 | 88.5 | 87.9 | 89.5 | 88.5 | 87.5 | 89.1 | | Unmeasurable | | |
| HCFC-123 | 85.9 | 85.1 | 85.4 | 85.6 | 85.7 | 86.2 | 85.1 | 86.4 | 84.2 | 84.0 | 87.5 | | | | |
| HCFC-141b | 86.1 | 86.7 | 86.5 | 85.1 | 86.9 | 87.5 | 85.8 | 86.9 | 85.3 | 86.1 | 88.2 | | | | |

Note:
L-5420: Silicon foam regulator (Product of Nihon-Unicar Ltd.)
Closed cell content: Beckmann air comparison hydrometer (made of TOSHIBA Corp.), (ASTM D-2856)

TABLE 5

| Polyol No. | Example 34 (12) | 35 (13) | 36 (14) | 37 (15) | 38 (16) | 39 (17) | 40 (18) | 41 (19) | 42 (20) | 43 (21) | 44 (22) | 45 (23) | 46 (24) | 47 (25) | 48 (26) |
|---|---|---|---|---|---|---|---|---|---|---|---|---|---|---|---|
| Raw Material (g) | | | | | | | | | | | | | | | |

TABLE 5-continued

| Polyol No. | 34 (12) | 35 (13) | 36 (14) | 37 (15) | 38 (16) | 39 (17) | 40 (18) | 41 (19) | 42 (20) | 43 (21) | 44 (22) | 45 (23) | 46 (24) | 47 (25) | 48 (26) |
|---|---|---|---|---|---|---|---|---|---|---|---|---|---|---|---|
| Glycerin base polyol (A) | 731 | 531 | 376 | 281 | | | | | 632 | 765 | | | | 185 | |
| Sorbitol base polyol | | | | | | 1124 | | | | | | | | | |
| Surose base polyol | | | | | | | 1233 | 804 | | | | | | | |
| Triethanolamine | | | | | 526 | | | | | | | | | | |
| Glycerin base polyol (B) | | | | | | | | | | | 369 | | 185 | 255 | |
| Aromatic amine base polyol | | | | | | | | | | | | | | | 50 |
| Diethanolamine | | | | | | | | | | | | 421 | 213 | (Polyol No. 22) 50 | |
| PCAA (g) | | | | | | | | | | | | | | | |
| Succinic angydride | 487 | 354 | 251 | 564 | 355 | 238 | 169 | 441 | | 510 | | | | | |
| Phthalic anhydride | | | | | | | | | 624 | | 297 | 297 | 297 | 297 | |
| Catalyst (g) | | | | | | | | | | | | | | | |
| Triethylamine | 2.2 | 4.5 | 2.2 | 2.2 | 2.2 | 2.2 | | 2.2 | 2.2 | 2.2 | 4.5 | 4.5 | 4.5 | 4.5 | 4.5 |
| Dimethylethanolamine | | | | | | | 2.2 | | | | | | | | |
| KOH | 2.2 | | 2.2 | 2.2 | 2.2 | 2.2 | 2.2 | 2.2 | 2.2 | 2.2 | | | | | |
| Alkylene Oxide (g) | | | | | | | | | | | | | | | |
| Propylene oxixe | 2538 | 616 | 872 | 654 | 618 | 828 | 784 | 1024 | 976 | | 834 | 782 | 810 | 718 | |
| Ethylene oxide | | | | | | | | | | 672 | | | | | |
| Yield (g) | 3721 | 1475 | 1481 | 1463 | 1479 | 2050 | 2090 | 2110 | 2150 | 1890 | 1472 | 1475 | 1471 | 1432 | |

Note:
PCAA: Polycaroxylic acid anhydride

TABLE 6

| | Comp. Example | | | |
|---|---|---|---|---|
| Polyol No. | 13 (7') | 14 (8') | 15 (9') | 16 (10') |
| Raw Material (g) | | | | |
| Glycerin base polyol (A) | 806 | 443 | 1032 | 262 |
| Sorbitol base polyol | | | | |
| Surose base polyol | | | | |
| Triethanolamine | | | | |
| Glycelin base polyol (B) | | | | |
| Aromatic amine base polyol | | | | |
| Diethanolamine | | | | |
| PCAA (g) | | | | |
| Succinic anhydride | 538 | 886 | 69 | 175 |
| Phthanic anhydride | | | | |
| Catalyst (g) | | | | |
| Triethylamine | 4.5 | 4.5 | 4.5 | 2.2 |
| Dimethylethanolamine | | | | |
| KOH | | | | 2.2 |
| Alkylene Oxide (g) | | | | |
| Propylene oxide | 156 | 171 | 399 | 1063 |
| Ethylene oxide | | | | |
| Yield (g) | 146 | 1488 | 1470 | 1469 |

Note:
PCAA: Polycaroxylic acid anhydride

TABLE 7

(Polyurethane Resin)

| | Example | | | | | | | | | | | | | | |
|---|---|---|---|---|---|---|---|---|---|---|---|---|---|---|---|
| Polyol No. | 49 (12) | 50 (13) | 51 (14) | 52 (15) | 53 (16) | 54 (17) | 55 (18) | 56 (19) | 57 (20) | 58 (21) | 59 (22) | 60 (23) | 61 (24) | 62 (25) | 63 (26) |
| OH-Value (mgKOH/g) | 397 | 363 | 236 | 202 | 365 | 366 | 347 | 255 | 357 | 440 | 451 | 478 | 450 | 461 | 460 |
| Viscosity (cp/25° C.) | 1400 | 810 | 630 | 17300 | 17000 | 21000 | 22000 | 36000 | 11000 | 1000 | 5100 | 5080 | 6200 | 8000 | 10000 |
| Acid value (mgKOH/g) | 0.1 | 0.0 | 0.0 | 0.0 | 0.1 | 0.1 | 0.0 | 0.1 | 0.1 | 0.0 | 0.0 | 0.0 | 0.0 | 0.0 | 0.0 |
| Resin formulation (g) | | | | | | | | | | | | | | | |
| Polyol | 12.00 | 12.00 | 12.00 | 12.00 | 12.00 | 12.00 | 12.00 | 12.00 | 12.00 | 12.00 | 12.00 | 12.00 | 12.00 | 12.00 | 12.00 |
| MDI-CR | 12.72 | 10.57 | 6.87 | 5.88 | 10.63 | 11.73 | 11.12 | 8.17 | 11.44 | 14.10 | 14.45 | 15.31 | 14.42 | 14.77 | 14.74 |
| Kaolizer No. 1 | 0.12 | 0.12 | 0.12 | 0.12 | 0.12 | 0.12 | 0.12 | 0.12 | 0.12 | 0.12 | 0.12 | 0.12 | 0.12 | 0.12 | 0.12 |
| Flon Absorption | | | | | | | | | | | | | | | |
| CFC-11 | | | | | | | | | | | | | | | |
| 0 hour | 24.84 | 22.69 | 18.99 | 18.00 | 22.75 | 23.85 | 23.24 | 20.29 | 23.56 | 26.22 | 26.57 | 27.43 | 26.54 | 26.89 | 26.86 |
| 24 hours | 24.84 | 22.69 | 18.99 | 18.01 | 22.75 | 23.85 | 23.24 | 20.29 | 23.56 | 26.22 | 26.57 | 27.43 | 26.54 | 26.89 | 26.86 |
| Absorption (%) | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| HCFC-123 | | | | | | | | | | | | | | | |
| 0 hour | 24.84 | 22.69 | 18.99 | 18.00 | 22.75 | 23.85 | 23.24 | 20.29 | 23.56 | 26.22 | 26.57 | 27.43 | 26.54 | 26.89 | 26.86 |
| 24 hours | 24.84 | 22.69 | 19.00 | 18.01 | 22.75 | 23.85 | 23.24 | 20.29 | 23.56 | 26.22 | 26.59 | 27.46 | 26.55 | 26.90 | 26.88 |
| Absorption (%) | 0.0 | 0.0 | 0.05 | 0.0 | 0.0 | 0.0 | 0.0 | 0.0 | 0.0 | 0.0 | 0.08 | 0.11 | 0.04 | 0.04 | 0.07 |
| HCFC-141b | | | | | | | | | | | | | | | |
| 0 hour | 24.84 | 22.69 | 18.99 | 18.00 | 22.75 | 23.85 | 23.24 | 20.29 | 23.56 | 26.22 | 26.57 | 27.43 | 26.54 | 26.89 | 26.86 |
| 24 hours | 24.84 | 22.69 | 18.99 | 18.00 | 22.75 | 23.85 | 23.24 | 20.29 | 23.56 | 26.22 | 26.59 | 27.45 | 26.55 | 26.91 | 26.87 |
| Absorption (%) | 0.0 | 0.0 | 0.0 | 0.0 | 0.0 | 0.0 | 0.0 | 0.0 | 0.0 | 0.0 | 0.08 | 0.07 | 0.04 | 0.07 | 0.04 |

TABLE 8

(Polyurethane Resin)

| | Comp. Example | | | |
|---|---|---|---|---|
| Polyol No. | 17 (7') | 18 (8') | 19 (9') | 20 (10') |
| HO-value (mgKOH/g) | 321 | 155 | 685 | 171 |
| Viscosity (cp/25° C.) | 2100 | 7160 | 980 | 480 |
| Acid value (mgKOH/g) | 256 | 186 | 0.0 | 0.0 |
| Resin formulation (g) | | | | |
| Polyol | 12.00 | 12.00 | 12.00 | 12.00 |
| MDI-CR | 16.81 | 9.93 | 19.95 | 4.98 |
| Kaolizer No. 1 | 0.12 | 0.12 | 0.12 | 0.12 |
| Flon Absorption | | | | |
| CFC-11 | | | | |
| 0 hour | 28.93 | 22.05 | 32.07 | 17.10 |
| 24 hours | * | * | 32.09 | 17.10 |
| Absorption (%) | * | * | 0.1 | 0.0 |
| HCFC-123 | | | | |
| 0 hour | 28.93 | 22.05 | 32.07 | 17.10 |
| 24 hours | * | * | 32.89 | 17.86 |
| Absorption (%) | * | * | 2.6 | 4.4 |
| HCFC-141b | | | | |
| 0 hour | 28.93 | 22.05 | 32.07 | 17.10 |
| 24 hours | * | * | 32.55 | 17.60 |
| Absorption (%) | * | * | 1.5 | 2.9 |

Note:
*Resin obtained was dissolved in flon, data could not be obtained

TABLE 9

(Polyurethane Foam)

| | Example | | | | | | | | | | | | | | |
|---|---|---|---|---|---|---|---|---|---|---|---|---|---|---|---|
| Polyol No. | 64 (12) | 65 (13) | 66 (14) | 67 (15) | 68 (16) | 69 (17) | 70 (18) | 71 (19) | 72 (20) | 73 (21) | 74 (22) | 75 (23) | 76 (24) | 77 (25) | 78 (26) |
| OH-value (mgKOH/g) | 397 | 363 | 236 | 202 | 365 | 366 | 347 | 255 | 357 | 440 | 451 | 478 | 450 | 461 | 460 |
| Viscosity (cp/25° C.) | 1400 | 810 | 630 | 17300 | 17000 | 21000 | 22000 | 36000 | 11000 | 1000 | 5100 | 5080 | 6200 | 8000 | 10000 |
| Acid value (mgKOH/g) | 0.1 | 0.0 | 0.0 | 0.0 | 0.1 | 0.1 | 0.0 | 0.1 | 0.1 | 0.0 | 0.0 | 0.0 | 0.0 | 0.0 | 0.0 |
| Foam formulation (g) | | | | | | | | | | | | | | | |
| Polyol | | | | | | | 100.0 | | | | | | | | |
| H₂O | | | | | | | 1.0 | | | | | | | | |
| L-5420 | | | | | | | 1.5 | | | | | | | | |
| Kaolizer No. 1 | | | | | | | 3.0 | | | | | | | | |
| Flon | 27 | 25 | 21 | 20 | 25 | 26 | 25 | 22 | 25 | 28 | 28 | 29 | 28 | 29 | 28 |
| MDI-CR | 121 | 112 | 78 | 70 | 112 | 113 | 108 | 83 | 110 | 132 | 135 | 142 | 135 | 138 | 137 |
| Operation efficiency | | | | | | | | | | | | | | | |
| CFC-11 | | | | | | | All good | | | | | | | | |
| HCFC-123 | | | | | | | | | | | | | | | |
| HCFC-141b | | | | | | | | | | | | | | | |
| Closed Cell (%) | | | | | | | | | | | | | | | |
| CFC-11 | 88.6 | 88.5 | 87.9 | 88.3 | 88.2 | 88.1 | 87.6 | 89.8 | 88.9 | 87.3 | 89.0 | 88.7 | 88.1 | 87.9 | 87.2 |
| HCFC-123 | 85.6 | 85.2 | 85.6 | 84.6 | 85.1 | 85.3 | 84.2 | 85.0 | 83.2 | 84.3 | 88.7 | 88.5 | 87.8 | 87.5 | 87.1 |
| HCFC-141b | 86.3 | 86.1 | 86.5 | 85.0 | 86.2 | 86.4 | 85.0 | 86.3 | 84.5 | 85.9 | 88.6 | 88.4 | 87.9 | 87.6 | 87.0 |

TABLE 10

(Polyurethane Foam)

| | Comp. Example | | | |
|---|---|---|---|---|
| Polyol No. | 21 (7') | 22 (8') | 23 (9') | 24 (10') |
| HO-value (mgKOH/g) | 321 | 155 | 685 | 171 |
| Viscosity (cp/25° C.) | 2100 | 7160 | 980 | 480 |
| Acid value (mgKOH/g) | 256 | 186 | 0.0 | 0.0 |
| Foam formuration (g) | | | | |
| Polyol | | 100.0 | | |
| H₂O | | 1.0 | | |
| L-5420 | | 1.5 | | |
| Kaolizer No. 1 | | 3.0 | | |
| Flon | 24 | 19 | 36 | 19 |
| MDI-CR | 101 | 57 | 197 | 61 |
| Operation efficiency | | | | |
| CFC-11 | All good | | | |
| HCFC-123 | | | | |
| HCFC-141b | | | | |
| Closed Cell Content (%) | | | | |
| CFC-11 | Unmeasurable | | | |
| HCFC-123 | | | | |
| HCFC-141b | | | | |

[Preparation of rigid polyurethane foam (Tables 11–14)]

Rigid polyurethane foams were prepared by the following procedures and physical properties examined.

Each resin premix was prepared according to the formulations illustrated in Tables 11–14, and rapidly mixed for 6 seconds at a rate of 5000 rpm with the prescribed amount of an organic polyisocyanate illustrated in the above tables. The mixture thus obtained was immediately poured into vertical wooden boxes having dimensions of 200×200×200 mm and 300×300×35 mm (thickness), respectively.

The rigid polyurethane foam obtained in the former box was used for measuring density, compressive strength and dimensional stability. The foam obtained in the latter box was used for measuring thermal conductivity.

Preparation of prepolymer

Polyol No. 1': Polyoxyalkylene polyol obtained by adding propylene oxide to glycerin. Hydroxyl value is 450 mgKOH/g. Viscosity is 480 cp/25° C.

TRC-90A: Crude tolylene diisocyanate having NCO content of 39.0 by weight.

Preparation of mixed prepolymers:

A mixture of 890 g of TRC-90A and 110 g of Polyol No.1'was heated at 80° C. for 2 hours and then cooled to the room temperature. The reaction mixture obtained was mixed with 1000 g of MDI-CR to obtain mixed prepolymer. NCO content was 31.0 %.

TABLE 11

| | Comp. Ex. 25 | Example 79 | Example 80 | Comp. Ex. 26 | Example 81 | Example 82 | Comp. Ex. 27 | Example 83 | Example 84 |
|---|---|---|---|---|---|---|---|---|---|
| Formulation (g) | | | | | | | | | |
| MDI-CR | | 172 | | | 181 | | | 170 | |
| Polyol (2) (Table 2) | | 100 | | | | | | | |
| Polyol (5) (Table 2) | | | | | 100 | | | | |
| Polyol (7) (Table 2) | | | | | | | | 100 | |
| Polyol (10) (Table 2) | | | | | | | | | |
| Polyol (11) (Table 2) | | | | | | | | | |
| H$_2$O | | 1.5 | | | 1.5 | | | 1.5 | |
| L-5420 | | 1.5 | | | 1.5 | | | 1.5 | |
| Kaolizer No. 1 | | 0.2 | | | 0.2 | | | 0.4 | |
| Foaming agent | | | | | | | | | |
| CFC-11 | 41 | | | 42 | | | 41 | | |
| HCFC-141b | | 35 | | | 37 | | | 35 | |
| HCFC-123 | | | 49 | | | 51 | | | 49 |
| HFC-134a | | | | | | | | | |
| Isopentane | | | | | | | | | |
| Foam property | | | | | | | | | |
| Density, Free foaming[1] (Kg/m$^3$) | 25.5 | 25.8 | 25.9 | 25.3 | 25.5 | 25.8 | 25.0 | 24.8 | 25.2 |
| Compressive strength[1] (Kg/m$^2$) | 1.83 | 1.65 | 1.66 | 1.51 | 1.45 | 1.44 | 1.70 | 1.65 | 1.62 |
| Dimension stability[1] (%, −30° C. × 24 Hr) | −0.4 | −0.9 | −1.5 | −0.6 | −1.8 | −1.8 | −0.4 | −0.9 | −1.3 |
| Thermal Conductivity[2] (Kcal/m. hr. °C.) | 0.0159 | 0.0163 | 0.0161 | 0.0165 | 0.0167 | 0.0168 | 0.0161 | 0.0163 | 0.0163 |

| | Comp. Ex. 28 | Example 85 | Example 86 | Comp. Ex. 29 | Example 87 | Example 88 |
|---|---|---|---|---|---|---|
| Formulation (g) | | | | | | |
| MDI-CR | | 145 | | | 118 | |
| Polyol (2) (Table 2) | | | | | | |
| Polyol (5) (Table 2) | | | | | | |
| Polyol (7) (Table 2) | | | | | | |
| Polyol (10) (Table 2) | | 100 | | | | |
| Polyol (11) (Table 2) | | | | | 100 | |
| H$_2$O | | 1.5 | | | 1.5 | |
| L-5420 | | 1.5 | | | 1.5 | |
| Kaolizer No. 1 | | 0.2 | | | 0.3 | |
| Foaming agent | | | | | | |
| CFC-11 | 37 | | | 33 | | |
| HCFC-141b | | 32 | | | 28 | |
| HCFC-123 | | | 44 | | | 39 |
| HFC-134a | | | | | | |
| Isopentane | | | | | | |
| Foam property | | | | | | |
| Density, Free foaming[1] (Kg/m$^3$) | 25.5 | 25.1 | 25.5 | 24.4 | 24.5 | 25.5 |
| Compressive strength[1] (Kg/m$^2$) | 1.50 | 1.30 | 1.25 | 1.81 | 1.61 | 1.65 |
| Dimension stability[1] (%, −30° C. × 24 Hr) | −0.2 | −0.4 | −1.0 | −0.2 | −0.8 | −0.7 |
| Thermal Conductivity[2] (Kcal/m. hr. °C.) | 0.0163 | 0.0165 | 0.0167 | 0.0160 | 0.0161 | 0.0164 |

Note:
[1] In accordance with JIS A 9514
[2] In accordance with JIS A 1412

TABLE 12

| | Comp. Ex. 30 | Example 89 | Example 90 | Comp. Ex. 31 | Example 91 | Example 92 | Comp. Ex. 32 | Example 93 | Example 94 | Comp. Ex. 33 | Example 95 | Example 96 |
|---|---|---|---|---|---|---|---|---|---|---|---|---|
| Formulation (g) | | | | | | | | | | | | |
| MDI-CR | | | | 150 | | | 145 | | | | 145 | |
| Mixed prepolymer | | 145 | | | | | | | | | | |
| Polyol (2) | | | | | | | | | | | | |
| Polyol (5) | | | | | | | | | | | | |
| Polyol (7) | | | | | | | | | | | | |
| Polyol (10) | | 100 | | | | | | 100 | | | | 100 |
| Polyol (11) | | | | | | | | | | | | |
| Polyol (23) (Table 5) | | | | | 100 | | | | | | | |

TABLE 12-continued

| | Comp. Ex. 30 | Example 89 | Example 90 | Comp. Ex. 31 | Example 91 | Example 92 | Comp. Ex. 32 | Example 93 | Example 94 | Comp. Ex. 33 | Example 95 | Example 96 |
|---|---|---|---|---|---|---|---|---|---|---|---|---|
| $H_2O$ | | 1.5 | | | 1.5 | | | 1.5 | | | 1.5 | |
| L-5420 | | 1.5 | | | 1.5 | | | 1.5 | | | 1.5 | |
| Kaolizer No. 1 | | 0.2 | | | 0.8 | | | 0.2 | | | 0.2 | |
| Foaming agent | | | | | | | | | | | | |
| CFC-11 | 37 | | | 38 | | | 37 | | | 37 | | |
| HCFC-141b | | 32 | | | 33 | | | 32 | | | 32 | |
| HCFC-123 | | | 44 | | | 45 | | | 40 | | | 40 |
| HFC-134a | | | | | | | | | 3 | | | |
| Isopentane | | | | | | | | | | | | 4 |
| Foam property | | | | | | | | | | | | |
| Density, Free foaming ($Kg/m^3$) | 24.5 | 24.8 | 25.2 | 24.8 | 25.3 | 25.5 | 25.0 | 25.1 | 25.3 | 25.0 | 25.1 | 25.2 |
| Compressive strengh ($Kg/m^2$) | 1.51 | 1.32 | 1.26 | 1.50 | 1.32 | 1.27 | 1.50 | 1.30 | 1.24 | 1.50 | 1.30 | 1.20 |
| Dimension stability (%, −30° C. × 24 Hr) | −0.1 | −0.3 | −0.8 | −0.2 | −0.3 | −0.5 | −0.2 | −0.4 | −1.0 | −0.2 | −0.4 | −1.0 |
| Thermal Conductivity (Kcal/m. hr. °C.) | 0.0158 | 0.0159 | 0.0161 | 0.0160 | 0.0162 | 0.0164 | 0.0163 | 0.0165 | 0.0167 | 0.0163 | 0.0165 | 0.0167 |

TABLE 13

| | Comp. Ex. 34 | Example 97 | Example 98 | Comp. Ex. 35 | Example 99 | Example 100 | Comp. Ex. 36 | Example 101 | Example 102 |
|---|---|---|---|---|---|---|---|---|---|
| Formulation (g) | | | | | | | | | |
| MDI-CR | | 161 | | | 122 | | | 121 | |
| Mixed prepolymer | | | | | | | | | |
| Polyol (12) (Table 5) | | 100 | | | | | | | |
| Polyol (16) (Table 5) | | | | | 100 | | | | |
| Polyol (17) (Table 5) | | | | | | | | 100 | |
| Polyol (18) (Table 5) | | | | | | | | | |
| Polyol (20) (Table 5) | | | | | | | | | |
| Polyol (21) (Table 5) | | | | | | | | | |
| $H_2O$ | | 1.5 | | | 1.5 | | | 1.5 | |
| L-5420 | | 1.5 | | | 1.5 | | | 1.5 | |
| Kaolizer No. 1 | | 1.8 | | | 0.2 | | | 2.2 | |
| Foaming agent | | | | | | | | | |
| CFC-11 | 39 | | | 33 | | | 33 | | |
| HCFC-141b | | 33 | | | 28 | | | 28 | |
| HCFC-123 | | | 47 | | | 40 | | | 40 |
| Foam property | | | | | | | | | |
| Density, Free foaming ($Kg/m^3$) | 25.0 | 25.3 | 25.4 | 24.8 | 25.0 | 25.1 | 25.0 | 25.0 | 25.2 |
| Compressive strength ($Kg/m^2$) | 1.55 | 1.38 | 1.30 | 1.30 | 1.15 | 1.18 | 1.65 | 1.40 | 1.38 |
| Dimension stability (%, −30° C. × 24 Hr) | −0.8 | −1.5 | −0.8 | −0.6 | −1.8 | −2.0 | −0.4 | −1.0 | −1.5 |
| Thermal Conductivity (Kcal/m. hr. °C.) | 0.0161 | 0.0165 | 0.0163 | 0.0168 | 0.0170 | 0.0171 | 0.0163 | 0.0165 | 0.0165 |

| | Comp. Ex. 37 | Example 103 | Example 104 | Comp. Ex. 38 | Example 105 | Example 106 |
|---|---|---|---|---|---|---|
| Formulation (g) | | | | | | |
| MDI-CR | | 116 | | | 119 | |
| Mixed prepolymer | | | | | | |
| Polyol (12) (Table 5) | | | | | | |
| Polyol (16) (Table 5) | | | | | | |
| Polyol (17) (Table 5) | | | | | | |
| Polyol (18) (Table 5) | | 100 | | | | |
| Polyol (20) (Table 5) | | | | | 100 | |
| Polyol (21) (Table 5) | | | | | | |
| $H_2O$ | | 1.5 | | | 1.5 | |
| L-5420 | | 1.5 | | | 1.5 | |
| Kaolizer No. 1 | | 2.0 | | | 1.5 | |
| Foaming agent | | | | | | |
| CFC-11 | 32 | | | 33 | | |
| HCFC-141b | | 28 | | | 28 | |
| HCFC-123 | | | 39 | | | 39 |
| Foam property | | | | | | |
| Density, Free foaming ($Kg/m^3$) | 24.6 | 24.7 | 25.2 | 24.4 | 24.5 | 25.0 |

TABLE 13-continued

| | Example and Comparative Example | | | | | |
|---|---|---|---|---|---|---|
| Compressive strength (Kg/m²) | 1.50 | 1.25 | 1.19 | 1.51 | 1.21 | 1.20 |
| Dimension stability (%, −30° C. × 24 Hr) | −0.2 | −0.8 | −1.0 | −0.2 | −0.7 | −0.6 |
| Thermal Conductivity (Kcal/m. hr. °C.) | 0.0165 | 0.0168 | 0.0170 | 0.0161 | 0.0162 | 0.0165 |

TABLE 13

| | Example and Comparative Example | | | | | |
|---|---|---|---|---|---|---|
| | Comp. Ex. 39 | Example 107 | Example 108 | Comp. Ex. 40 | Example 109 | Example 110 |
| Formulation (g) | | | | | | |
| MDI-CR | 140 | | | | | |
| Mixed prepolymer | | | | 119 | | |
| Polyol (12) (Table 5) | | | | | | |
| Polyol (16) (Table 5) | | | | | | |
| Polyol (17) (Table 5) | | | | | | |
| Polyol (18) (Table 5) | | | | | | |
| Polyol (20) (Table 5) | | | | | 100 | |
| Polyol (21) (Table 5) | | 100 | | | | |
| H₂O | | 1.5 | | | 1.5 | |
| L-5420 | | 1.5 | | | 1.5 | |
| Kaolizer No. 1 | | 1.6 | | | 1.6 | |
| Foaming agent | | | | | | |
| CFC-11 | 36 | | | 33 | | |
| HCFC-141b | | 31 | | | 28 | |
| HCFC-123 | | | 43 | | | 39 |
| Foam property | | | | | | |
| Density, Free foaming (Kg/m³) | 25.2 | 25.1 | 25.5 | 24.0 | 24.2 | 24.8 |
| Compressive strength (Kg/m²) | 1.61 | 1.40 | 1.38 | 1.51 | 1.20 | 1.20 |
| Dimension stability (%, −30° C. × 24 Hr) | −0.1 | −1.0 | −1.2 | −0.1 | −0.8 | −0.8 |
| Thermal Conductivity (Kcal/m. hr. °C.) | 0.0162 | 0.0164 | 0.0165 | 0.0159 | 0.0160 | 0.0161 |

TABLE 14

| | Comparative Example | | | | | |
|---|---|---|---|---|---|---|
| | 41 | 42 | 43 | 44 | 45 | 46 |
| Formulation (g) | | | | | | |
| MDI-CR | | 144 | | | 144 | |
| Polyol (1') (Table 1) | | 100 | | | | |
| Polyol (2') (Table 1) | | | | | 100 | |
| H₂O | | 1.5 | | | 1.5 | |
| L-5420 | | 1.5 | | | 1.5 | |
| Kaolizer No. 1 | | 3.0 | | | 2.8 | |
| Foaming agent | | | | | | |
| CFC-11 | 37 | | | 37 | | |
| HCFC-141b | | 30 | | | 30 | |
| HCFC-123 | | | 44 | | | 44 |
| Foam property | | | | | | |
| Density, Free foaming (Kg/m³) | 24.5 | 25.0 | 25.0 | 25.0 | 25.1 | 25.3 |
| Compressive strength (Kg/cm²) | 1.51 | 0.98 | 1.05 | 1.61 | 1.00 | 0.95 |
| Dimension stability (%, −30° C. × 24 hr) | −0.5 | −3.6 | −5.8 | −1.0 | −4.8 | −7.2 |
| Thermal Conductivity (Kcal/m. hr. °C.) | 0.0168 | 0.0179 | 0.0182 | 0.0165 | 0.0180 | 0.0183 |

(1) Preparation of rigid polyurethane foam composite having facing material

According to the above examples, preparation of a rigid polyurethane foam composite having facing material of the invention was carried out.

Polyols obtained in examples and comparative examples illustrated in Table 1, Table 2 and Table 5 were used as the raw material of rigid polyurethane foams.

The facing material for use in the invention includes corrugated paper boards, laminated papers and other paper products; polyethylene, polypropylene, polyvinyl chloride and other synthetic resin plates; and aluminum, steel and other metal plates.

1) Polyurethane foam composite having one facing material

The same formulations as illustrated in Table 15 were sprayed on a facing material under the following conditions to prepare a rigid polyurethane foam having one facing material. Properties of the product obtained are summarized in Table 16.

Atomizer: Model-FF Head D Gum (a product of Gusmer Co., Ltd.)
Output pressure: 50 kg/cm$^2$
Liquid temperature: 40° C.
Face material: Corrugated paper board

TABLE 15

|  | Example | | | Comp. Example | | |
| --- | --- | --- | --- | --- | --- | --- |
|  | 111 | 112 | 113 | 47 | 48 | 49 |
| Formulation (g) | | | | | | |
| MDI-CR | 154 | 154 | 124 | 127 | 127 | 127 |
| Polyol (2) (Table 2) | 100 | 100 | | | | |
| Polyol (21) (Table 5) | | | 100 | | | |
| Polyol (1') (Table 1) | | | | 100 | 100 | |
| Polyol (2') (Table 1) | | | | | | 100 |
| TCEP | 10 | 10 | 10 | 10 | 10 | 10 |
| H$_2$O | 0.5 | 0.5 | 0.5 | 0.5 | 0.5 | 0.5 |
| L-5420 | 1.5 | 1.5 | 1.5 | 1.5 | 1.5 | 1.5 |
| Kaolizer No. 1 | 1.5 | 1.5 | 3.0 | 5.0 | 5.0 | 5.0 |
| LL-690D | 0.1 | 0.1 | 0.1 | 0.1 | 0.1 | 0.1 |
| CFC-11 | | | | 19 | | |
| HCFC-141b | 33 | | | | 17 | |
| HCFC-123 | | 46 | 46 | | | 23 |

Note:
TCEP: Flame ratardant, Tris(2-chloroethyl)phosphate, product of Daihachi Chemical Co.
LL-690D: Catalyst, solution of 40% by weight of lead octylate in dioctylphthalate

TABLE 16

|  | Example | | | Comp. Example | | |
| --- | --- | --- | --- | --- | --- | --- |
|  | 111 | 112 | 113 | 47 | 48 | 49 |
| Reactivity | | | | | | |
| Tack-free time (sec) | 4~5 | 4~5 | 4~5 | 5 | 5~6 | 5 |
| Sag phenomenon | no | no | no | no | found | found |
| Surface appearance | good | good | good | good | good | good |
| Adhesion | good | good | good | good | good | good |
| Foam density (Kg/m$^3$) | 36.5 | 37.0 | 37.0 | 38.0 | 39.0 | 39.0 |
| Compressive strength (Kg/m$^2$) | 3.33 | 3.35 | 3.25 | 3.25 | 3.10 | 2.95 |
| Thermal conductivity (Kcal/m. hr. °C.) | 0.0175 | 0.0172 | 0.0176 | 0.0180 | 0.0190 | 0.0188 |
| Combustibility | | | | | | |
| Time burned (sec) | 23 | 24 | 23 | 24 | 35 | 33 |
| Distance burned (mm) | 18 | 17 | 18 | 19 | 20 | 21 |

Note:
Sag phenomenon: Sag is a phenomenon where a raw material mixture before curing sags or runs down on a vertical surface when the mixture is sprayed to foam on the surface
Combustibility (Flame retardance): It is measured in accordance with ASTM D 1691.

2) Preparation of rigid polyurethane foam having a plurality of facing material

In the test, rigid polyurethane foam composite boards having two facing materials were prepared with a continuous process under the following conditions by using the formulations illustrated in Table 17.

Foaming machine: High pressure foam dispensing machine Model-MQ (a product of Hennecke Machinen Bau)
Line speed: 10 m/min
Temperature: Material: 30°–40° C. Cure oven: 55° C.
Product: 1 m Width×40 mm Thickness 35 mm Foam layer
Facing material: Laminated paper on the top and bottom surface Physical properties of the product are illustrated in Table 18.

TABLE 17

|  | Example | | | Comp. Example | | |
| --- | --- | --- | --- | --- | --- | --- |
|  | 114 | 115 | 116 | 50 | 51 | 52 |
| Formulation (g) | | | | | | |
| MDI-CR | 145 | 145 | 118 | 144 | 144 | 144 |
| Polyol (10) (Table 2) | 100 | 100 | | | | |
| Polyol (11) (Table 2) | | | 100 | | | |
| Polyol (1') (Table 1) | | | | 100 | 100 | |
| Polyol (2') (Table 1) | | | | | | 100 |
| TCEP | 10 | 10 | 10 | 10 | 10 | 10 |
| H$_2$O | 1.5 | 1.5 | 1.5 | 1.5 | 1.5 | 1.5 |
| L-5420 | 1.5 | 1.5 | 1.5 | 1.5 | 1.5 | 1.5 |
| Kaolizer No. 1 | 0.2 | 0.2 | 0.3 | 3.0 | 3.0 | 2.8 |
| CFC-11 | | | | 37 | | |
| HCFC-141b | 32 | | | | 30 | |
| HCFC-123 | | 44 | 39 | | | 44 |

TABLE 18

|  | Example | | | Comp. Example | | |
| --- | --- | --- | --- | --- | --- | --- |
|  | 114 | 115 | 116 | 50 | 51 | 52 |
| Formulation (Table 17) | 114 | 115 | 116 | 50 | 51 | 52 |
| Adhesion between face material and foam | good | good | good | good | good | good |
| Foam density (Kg/m$^3$) | 31.5 | 32.0 | 31.8 | 30.0 | 31.0 | 31.5 |
| Compressive strength (Kg/cm$^2$) | 1.53 | 1.50 | 1.60 | 1.55 | 1.05 | 1.00 |
| Flexural strength (Kg/cm$^2$) | 2.40 | 2.30 | 2.35 | 2.45 | 1.95 | 1.85 |
| Thermal conductivity (Kcal/m. hr. °C.) | 0.0170 | 0.0172 | 0.0173 | 0.0170 | 0.0185 | 0.0186 |
| Combustibility | | | | | | |
| Time burned (sec) | 22 | 21 | 21 | 23 | 30 | 31 |
| Distance burned (mm) | 16 | 14 | 15 | 16 | 21 | 20 |

As seen in these results, the polyols of the invention have suitable reactivity. Consequently, the mixture of foaming ingredients does not cause sagging phenomenon, even when it is sprayed on a vertical face material, and can give good appearance on the surface of spray applied foam. Good adhesion of sprayed foam to the face material can also be obtained. The rigid foam thus obtained has excellent flame retardance and low thermal conductivity, and thus provides composite boards having excellent performance.

The formulations used in the preparation of rigid polyurethane foam composites are illustrated in Table 15 and 17. However, the formulations are not limited to the above embodiment and it is to be understood that the formulations illustrated in Examples 1 to 110 can also be used for the preparation of polyurethane foam composites.

What is claimed is:

1. A polyol prepared by adding an alkylene oxide to at least one compound having at least one ester bond per molecule, said compound(s) being the reaction product of an organic polycarboxylic acid or anhydride thereof, with one or more compounds selected from the group consisting of:
   (a) polyhydric alcohols having from 3 to 8 hydroxyl groups per molecule, and
   (b) polyoxyalkylene polyols having from 3 to 8 hydroxyl groups per molecule, wherein the organic polycarboxylic acid or anhydride thereof is reacted in an amount of from 0.125 to 1.0 mole per one mole of hydroxyl groups of compounds (a) and/or (b), and wherein said polyol is effective for providing a rigid polyurethane foam upon mixing and reacting an organic polyisocyanate with a resin premix comprising said polyol at an equivalent ratio of polyisocyanate to hydroxyl group in the resin premix of from about 0.8 to 5.0, which rigid polyurethane foam is foamed by a solvent selected from the group of 2,2-dichloro-1,1,1-trifluoroethane, 1,1-dichloro-1-fluoroethane, 1,1,1,2-tetrafluoroethane, 1,1-difluoroethane and mixtures thereof, yet maintains a closed cell content substantially the same as that obtained by CFC foaming agents.

2. A polyol according to claim 1, wherein the alkylene oxide is added in an amount of from 1 to 3 moles per one mole of each hydroxyl group and carboxyl group in the starting material.

3. A polyol according to claim 1, wherein the reaction of polyhydric alcohol(a) and/or polyoxyalkylene polyol(b) with the organic polycarboxylic acid or anhydride thereof, and the reaction of alkylene oxide to the reaction product thereof are conducted in the presence of an amine catalyst represented by formula (IV) or formula (V) and/or a metal hydroxide catalyst:

NR$_2$R$_2$R$_3$                 (IV);

R$_2$R$_3$N(CH$_2$)$_m$R$_2$R$_3$              (V);

wherein R$_2$ and R$_3$ are an atom or group selected from a group consisting of hydrogen alkyl groups having from 1 to 6 carbon atoms, —CH$_2$CH$_2$OH and —CH$_2$CH(CH$_3$)OH, with the proviso that R$_2$ and R$_3$ are not both hydrogen atoms in the formula (IV), and m is an integer of from 1 to 6.

4. A polyurethane resin prepared by mixing and reacting a polyol component with an organic polyisocyanate, said polyol component comprising the polyol of claim 1.

5. A polyurethane resin according to claim 4, wherein the amount of said polyol is in the range of from 30 to 100 parts by weight per 100 parts by weight of said polyol component.

6. A polyurethane resin according to claim 4, wherein the reaction of the polyol with the organic polyisocyanate is conducted in the presence of a catalyst.

7. A polyurethane resin according to claim 4, wherein the organic polyisocyanate comprises an isocyanate terminated prepolymer.

8. A polyurethane resin according to claim 4, wherein the equivalent ratio of isocyanate groups in the organic polyisocyanate to the hydroxyl groups of the polyol component is in the range of from 0.8 to 5.0.

9. A rigid polyurethane foam obtained by mixing and reacting an organic polyisocyanate with a resin premix comprising a polyol component, a foaming agent, a catalyst, and a cell regulator, at an equivalent ratio of polyisocyanate to hydroxyl group in the resin premix of from about 0.8 to 5.0, said polyol component comprising the polyol of claim 1, and said foaming agent comprising at least one member selected from the group consisting of hydrochlorofluorocarbons, hydrofluorocarbons, and mixtures thereof.

10. A rigid polyurethane foam according to claim 9, wherein said resin premix further comprises an auxiliary foaming agent selected from the group consisting of water, low boiling point compounds, and mixtures thereof.

11. A rigid polyurethane foam according to claim 9, said premix comprising 2,2-dichloro-1,1,1-trifluoroethane, 1,1-dichloro-1-fluoroethane, 1,1,1,2-tetrafluoroethane and/or 1,1-difluoroethane.

12. A polyurethane resin according to claim 9, wherein the amount of polyol ranges from 30 to 100 parts by weight of said polyol component.

13. A rigid polyurethane foam according to claim 10, wherein the auxiliary foaming agent comprises a low boiling point compound.

14. A rigid polyurethane foam according to claim 9, wherein all or part of the organic polyisocyanate is a prepolymer.

15. A process for preparing a rigid polyurethane foam comprising mixing and reacting an organic polyisocyanate with a resin premix, said resin premix comprising a polyol component, a foaming agent, a catalyst, and a cell regulator, at an equivalent ratio of polyisocyanate to hydroxyl group in the resin premix of from about 0.8 to 5.0, wherein said polyol component comprises the polyol of claim 1, and said foaming agent comprises at least one member selected from the group consisting of hydrochlorofluorocarbons, hydrofluorocarbons, and mixtures thereof.

16. A process according to claim 15, wherein said premix further comprises an auxiliary foaming agent selected from the group consisting of water, low boiling compounds, and mixtures thereof.

17. A process according to claim 15, wherein the amount of polyol of claim 1 of said polyol component ranges from 30 to 100 parts by weight per 100 parts by weight of said polyol component.

18. A process according to claim 15, wherein the premix comprises 2,2-dichloro-1,1,1-trifluoroethane, 1,1'-dichloro-1-fluoroethane, 1,1,1,2-tetrafluoroethane, and/or 1,1-difluoroethane.

19. A process according to claim 16, wherein the auxiliary foaming agent comprises a low boiling point compound.

20. A process according to claim 15, wherein all or part of the organic polyisocyanate is a prepolymer.

21. A process for the preparation of a rigid polyurethane foam composite by (i) mixing an organic polyisocyanate with a resin premix containing a polyol component, a foaming agent, a catalyst, and a cell regulator, at an equivalent ratio of polyisocyanate to hydroxyl group in the resin premix of from about 0.8 to 5.0, and (ii) foaming said rigid polyurethane foam on a facing material or in a cavity surrounded by a plurality of facing materials to constitute said composite, wherein the polyol component of said premix comprises the polyol of claim 1, and said foaming agent comprising at least one member selected from the group consisting of hydrochlorofluorocarbons, hydrofluorocarbons, and mixtures thereof.

22. A process according to claim 21, wherein said premix further comprises an auxiliary foaming agent selected from the group consisting of water, low boiling point compounds, and mixtures thereof.

23. A process according to claim 21, wherein the amount of polyol ranges from 30 to 100 parts by weight per 100 parts by weight of said polyol component.

24. A process according to claim 21, wherein the plurality of the facing materials comprises a pair of facing materials opposite to each other.

25. A process according to claim 21, wherein the plurality of facing materials comprises a top facing material, a bottom facing material and a plurality of side facing materials.

26. A process according to claim 21, wherein the plurality of facing materials comprises a bottom facing material and a plurality of side facing materials.

27. A process according to claim 21, comprising preparing a rigid polyurethane foam by applying to, pouring in, or spraying on the plurality of facing materials.

28. A process according to claim 21, comprising preparing a rigid polyurethane foam by spraying on one facing material.

29. A process according to claim 21, wherein the resin premix comprises 2,2-dichloro-1,1,1-trifluoroethane, 1,1-dichloro-1-fluoroethane, and 1,1,1,2-tetrafluoroethane or 1,1-difluoroethane.

30. A process according to claim 22, wherein the auxiliary foaming agent is a low boiling point compound.

31. A process according to claim 21, wherein all or part of the organic polyisocyanate is a prepolymer.

* * * * *

UNITED STATES PATENT AND TRADEMARK OFFICE
CERTIFICATE OF CORRECTION

PATENT NO. : 5,397,810

DATED:      : March 14, 1995

INVENTOR(S) : Ozaki et al

It is certified that error appears in the above-identified patent and that said Letters Patent is hereby corrected as shown below:

IN THE ABSTRACT:

Line 3, amend "alkamlamine" to --alkanolamine--.

Signed and Sealed this

Fifth Day of March, 1996

Attest:

BRUCE LEHMAN

*Attesting Officer*     *Commissioner of Patents and Trademarks*